United States Patent
Kato et al.

(10) Patent No.: US 9,360,548 B2
(45) Date of Patent: Jun. 7, 2016

(54) RADAR SYSTEM AND POWER-SUPPLY DEVICE INCORPORATED IN THE SAME

(75) Inventors: Yusuke Kato, Okazaki (JP); Kazuma Natsume, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 669 days.

(21) Appl. No.: 13/415,227

(22) Filed: Mar. 8, 2012

(65) Prior Publication Data

US 2012/0229323 A1    Sep. 13, 2012

(30) Foreign Application Priority Data

Mar. 9, 2011    (JP) .................................. 2011-051766

(51) Int. Cl.
| | |
|---|---|
| G01S 7/02 | (2006.01) |
| G01S 13/34 | (2006.01) |
| G01S 13/58 | (2006.01) |
| G01S 13/93 | (2006.01) |

(52) U.S. Cl.
CPC ............... *G01S 7/023* (2013.01); *G01S 13/345* (2013.01); *G01S 13/584* (2013.01); *G01S 13/931* (2013.01); *G01S 2013/9321* (2013.01)

(58) Field of Classification Search
CPC ..... G01S 7/023; G01S 13/584; G01S 13/345; G01S 13/931; G01S 2013/9321
USPC .................. 342/128, 133, 107, 146, 175, 200
See application file for complete search history.

(56) References Cited

U.S. PATENT DOCUMENTS

| | | | | |
|---|---|---|---|---|
| 4,189,732 | A | * | 2/1980 | Atwater ......................... 342/202 |
| 4,190,882 | A | * | 2/1980 | Chevalier et al. ............... 363/26 |
| 5,517,196 | A | * | 5/1996 | Pakett et al. .................... 342/70 |
| 5,590,033 | A | * | 12/1996 | Kawano .......................... 363/25 |
| 6,646,589 | B2 | * | 11/2003 | Natsume ......................... 342/70 |
| 8,599,062 | B2 | * | 12/2013 | Szajnowski ................... 342/109 |

FOREIGN PATENT DOCUMENTS

| | | |
|---|---|---|
| CN | 1392957 | 1/2003 |
| JP | 2001-091631 | 4/2001 |
| JP | 2001-221854 | 8/2001 |

(Continued)

OTHER PUBLICATIONS

Office Action dated Nov. 29, 2013 in corresponding Chinese Application No. 201210060465.7.

(Continued)

*Primary Examiner* — Matthew M Barker
(74) *Attorney, Agent, or Firm* — Harness, Dickey & Pierce, P.L.C.

(57) ABSTRACT

A power-supply device for supplying electrical power to a radar device that transmits and receives a continuous wave and detects an object reflecting the continuous wave on the basis of a spectrum of a beat signal of the transmitted and reflected waves. The power-supply device includes a power supply section that generates electrical power in a predefined voltage range through a switching section being turned on and off in response to a switching signal, and a switching signal output section that, outputs the switching signal whose frequency is set within one of assignable bands. This leads to a radar system comprised of the radar device and the power-supply device, capable of securely preventing erroneous detection of a frequency peak of the switching signal as a frequency peak of the object.

6 Claims, 10 Drawing Sheets

(56) References Cited

FOREIGN PATENT DOCUMENTS

| JP | 2003-217047 | 7/2003 |
|----|-------------|--------|
| JP | 2007-093628 | 4/2007 |
| JP | 2009-264952 | 11/2009 |

OTHER PUBLICATIONS

Office Action issued Dec. 27, 2012 in corresponding Japanese Application No. 2011-051766 with English translation.

* cited by examiner

RADAR SYSTEM AND POWER-SUPPLY DEVICE INCORPORATED IN THE SAME

CROSS-REFERENCE TO RELATED APPLICATION

This application is based on and claims the benefit of priority from earlier Japanese Patent Application No. 2011-51766 filed Mar. 9, 2011, the description of which is incorporated herein by reference.

BACKGROUND

1. Technical Field

This invention relates to a power-supply device that supplies electrical power to a radar device adapted to detect an object on the basis of a Fourier transform of a beat signal, and relates to a radar system including the radar device and the power-supply device.

2. Related Art

A known vehicle-mounted radar system, as described in Japanese Patent Application Publication No. 2009-264952, includes a radar device that transmits and receives a continuous wave, generates a beat signal by mixing a received signal (reflected wave from an object) with its transmit signal, samples the beat signal, and then detects the object on the basis of a Fourier transform (FFT) of the beat signal. The radar system further includes a power-supply device that supplies electrical power to the radar device.

The power-supply device in the radar system disclosed in Japanese Patent Application Publication No. 2009-264952, which serves as a switching power-supply, converts electrical power from a vehicle battery into electrical power in a predefined voltage range by turning on and off a switcher in response to a switching clock, thereby supplying the power to the radar device.

The power-supply device disclosed in Japanese Patent Application Publication No. 2009-264952 further includes a signal selector that selects one of a plurality of switching clocks having mutually different frequencies and outputs the selected switching clock to the switcher.

More specifically, the signal selector disclosed in Japanese Patent Application Publication No. 2009-264952 receives a reference clock generated in a reference clock generation circuit provided external to the radar system, and a clock signal generated in a switching clock generator in the radar device, where a frequency of the clock signal is set to a Nyquist frequency (half a sampling frequency for sampling the beat signal). The signal selector outputs the reference clock as a switching clock for a prescribed period of time from the start of power supply to the whole radar system, and outputs the clock signal as another switching clock after the end of the prescribed period of time.

That is, in the radar system disclosed in Japanese Patent Application Publication No. 2009-264952, a frequency peak that corresponds to a switching frequency (i.e., the frequency of the clock signal) appears at ends of a frequency distribution given by the Fourier transform of the beat signal. This can prevent the frequency peak corresponding to the switching frequency from being erroneously detected as the object.

However, in practice, the frequency of the clock signal generated in the switching clock generator has a large error relative to the target frequency (for example, of the order of 100 kHz) because of low accuracy in the clock signal frequency.

In the radar system disclosed in Japanese Patent Application Publication No. 2009-264952, such a large error can increase a possibility that the frequency of the clock signal is included in a frequency band in which a frequency peak corresponding to the object can appear, and thus leads to erroneous detection of the frequency peak corresponding to the frequency of the clock signal as the frequency peak of an object.

In consideration of the foregoing, exemplary embodiments of the present invention are directed to providing a radar system capable of securely preventing erroneous detection of the frequency peak corresponding to the frequency of the clock signal as the frequency peak of an object.

SUMMARY

In accordance with an exemplary embodiment of the present invention, there is provided a power-supply device for supplying electrical power to a radar device including: a transceiving section that transmits and receives a continuous wave and mixes a received signal with a transmit signal to generate a beat signal; and a signal processing section that samples the beat signal generated in the transceiving section and detects an object reflecting the continuous wave on the basis of a Fourier transform of the sampled beat signal.

The power-supply device includes: a switching section that is turned on and off in response to a switching signal; a power supply section that generates electrical power in a predefined voltage range through the switching section being turned on and off at a switching frequency of the switching signal and supplies the electrical power to the radar device; and a switching signal output section that outputs the switching signal of the switching frequency. The switching frequency is set within one of assignable bands including a specific band and all aliasing bands each aliasing to the specific band. The specific band is ranging from an upper limit frequency of the beat signal to a Nyquist frequency defined by half a sampling frequency for sampling the beat signal, where the sampling frequency is set such that the Nyquist frequency is higher than the upper limit frequency of the beat signal.

The upper limit frequency of the beat signal is a frequency of the beat signal corresponding to a maximum distance from the radar device at which an object can be detected by the radar device. The continuous wave may be a modulated signal or an unmodulated signal.

When the continuous wave emitted from the radar device is an unmodulated signal, the continuous wave may include continuous waves having different frequencies or may be a continuous wave of a single frequency. When the continuous wave is a modulated signal, the continuous is preferably a frequency modulated signal.

For example, when the continuous wave emitted from the radar device is a signal modulated in frequency by a modulation signal, one cycle of which has a triangular wave form as shown in FIG. 3 or 7, the upper limit frequency of the beat signal is determined as a frequency proportional to a maximum distance: Rmax ($=(c/4) \times (T/(F \times Ts))$), where c is a radio wave propagation speed, F is a frequency modulation width, T is a frequency modulation time, and Ts is a sampling period. The object is detectable at up to the maximum distance Rmax from the radar device.

In the above power-supply device of the present invention, electrical power in a predefined voltage range is generated through the switcher being turned on and off at a switching frequency of the switching signal and supplied to the radar device. The switching frequency is an inverse of a period of variation in signal level of the switching signal.

Further, in the above power-supply device of the present invention, the switching signal output section is adapted to output the switching signal having the switching frequency set within one of assignable bands. The assignable bands include a specific band ranging from an upper limit frequency of the beat signal to a Nyquist frequency defined by half a sampling frequency for sampling the beat signal, and all aliasing bands each aliasing to the specific band.

That is, in the power-supply device of the present invention, the beat signal is oversampled and the switching frequency is set within one of assignable bands including the specific band and all aliasing bands each aliasing to the specific band.

Therefore, in a frequency distribution given by a Fourier transform of the beat signal, a frequency peak corresponding to the switching frequency will be detected outside a frequency band from a lower limit frequency to the upper limit frequency of the beat signal, a frequency peak in which band is detectable as a function of a distance from the radar device to the object.

This can prevent the frequency peak corresponding to the switching frequency from being erroneously detected as a frequency peak of the object.

The power-supply device of the present invention doesn't have any signal selector as disclosed in Japanese Patent Application Publication No. 2009-264952, which can lead to downsizing and simplification of the power-supply device.

Preferably, the radar device is adapted to modulate a radio-frequency (RF) signal in frequency in response to a modulation signal having a triangular wave form as a function of time to output the continuous wave. The radar device may output the continuous wave that is a radio-frequency (RF) signal modulated in frequency by a modulation signal, one cycle of which includes a plurality of triangular modulation patterns having mutually different slopes.

In the power-supply device that supplies electrical power to such a radar device that modulates a radio-frequency (RF) signal in frequency by the plurality of modulation patterns, the switching signal output section may be adapted to output the switching signal of the switching frequency set within one of a set of common assignable bands such that each common assignable band is included in one of assignable bands for each of the triangular modulation patterns.

Alternatively, in the power-supply device that supplies electrical power to such a radar device that modulates a radio-frequency (RF) signal in frequency by the plurality of modulation patterns, the switching signal output section may be adapted to output the switching signal of the switching frequency set within one of assignable bands for the modulation pattern indicated by a pattern notification outputted from a notification output section further included in the radar device.

With the above power-supply device that supplies electrical power to the radar device with or without the notification output section that modulates a radio-frequency (RF) signal in frequency by the plurality of modulation patterns, whichever modulation pattern is being used to modulate the RF signal, the radar device can securely prevent the frequency peak corresponding to the switching frequency from being erroneously detected as a frequency peak of the object.

Additionally, in the above power-supply device that supplies electrical power to the radar device with the notification output section included therein, the switching signal output section may include a plurality of frequency signal generating sections for the respective modulation patterns, where each frequency signal generating section is adapted to output a signal of the switching frequency set within one of assignable bands for a corresponding modulation pattern. The switching signal output section may further include a frequency selecting section that selects and outputs one of the signals generated in the respective frequency signal generating sections in response to the pattern notification from the notification output section.

With the above power-supply device that supplies electrical power to the radar device with the notification output section included therein, the frequency selecting section switches between the switching frequencies in response to the pattern notification from the notification output section, which allows the switching section to receive the switching signal of optimal switching frequency for each modulation pattern.

In accordance with another exemplary embodiment of the present invention, there is provided a radar system including: a radar device including a transceiving section that transmits and receives a continuous wave and mixes a received signal with a transmit signal to generate a beat signal and a signal processing section that samples the beat signal generated in the transceiving section and detects an object reflecting the continuous wave on the basis of a Fourier transform of the sampled beat signal; and a power-supply device that supplies electrical power to the radar device.

The power-supply device includes: a switching section that is turned on and off in response to a switching signal; a power supply section that generates electrical power in a predefined voltage range through the switching section being turned on and off at a switching frequency of the switching signal and supplies the electrical power to the radar device; and a switching signal output section that outputs the switching signal of the switching frequency. The switching frequency is set within one of assignable bands including a specific band and all aliasing bands each aliasing to the specific band. The specific band is ranging from an upper limit frequency of the beat signal to a Nyquist frequency defined by half a sampling frequency for sampling the beat signal, where the sampling frequency is set such that the Nyquist frequency is higher than the upper limit frequency of the beat signal.

This can securely prevent a frequency peak corresponding to the switching frequency from being erroneously detected as a frequency peak of the object.

DESCRIPTION OF SPECIFIC EMBODIMENTS

The present invention will be described more fully hereinafter with reference to the accompanying drawings. Like numbers refer to like elements throughout.

(First Embodiment)
(Radar System)

Figure 1:
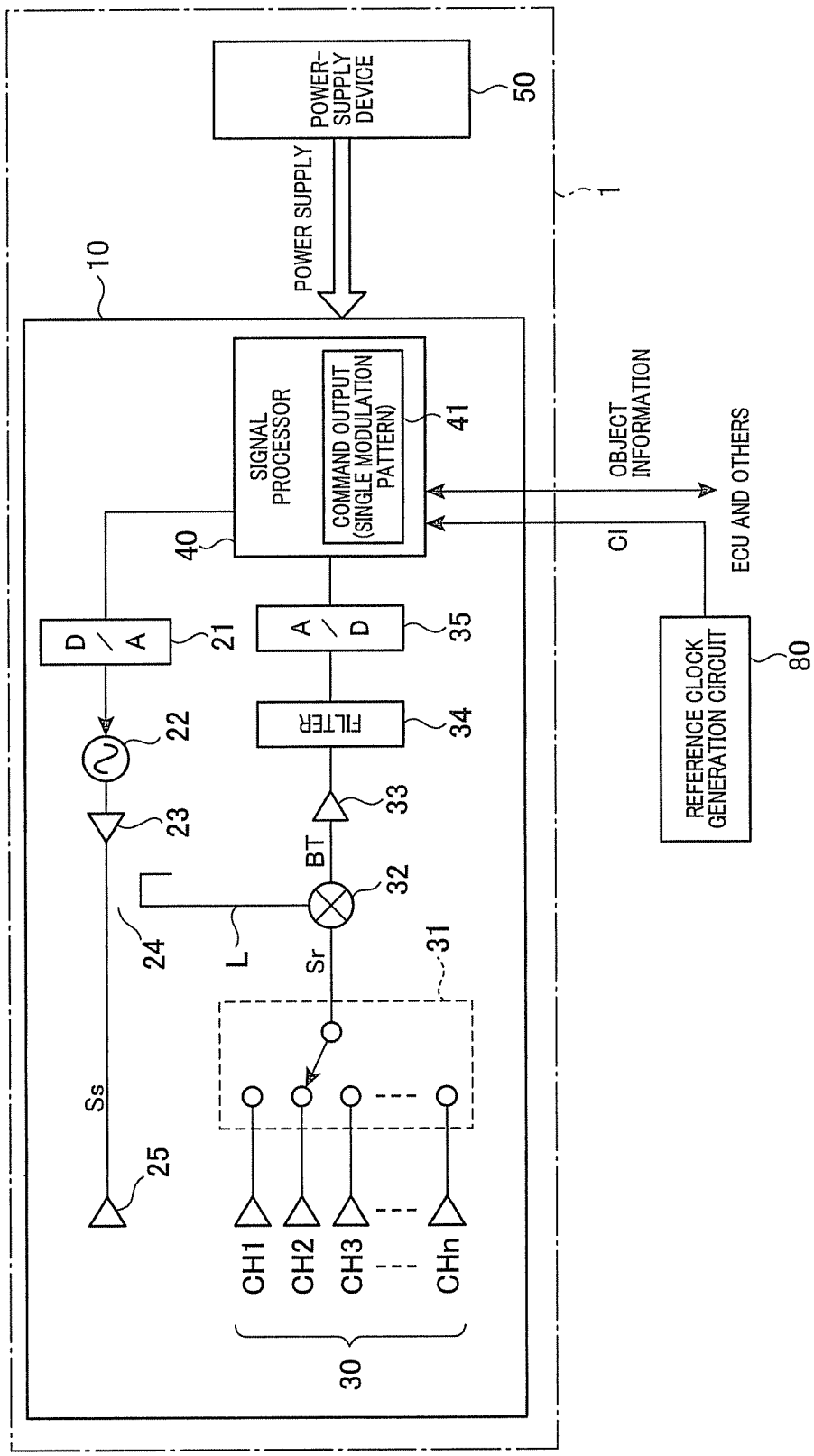
FIG. 1 schematically shows a block diagram of a radar system in accordance with a first embodiment of the present invention.

FIG. 1 schematically shows a block diagram of a radar system in accordance with a first embodiment of the present invention.

The radar system 1 detects an object, such as a preceding vehicle and a roadside object, and transmits object information that includes a position of the object (a distance and a direction of the object from the own vehicle) and a speed of the object (including a relative speed) to an electronic control unit (ECU) (not shown). The electronic control unit that acquires the object information from the radar system 1 is adapted to perform well-known Adaptive Cruise Control (ACC) or Pre-Crash Safety (PCS) control.

More specifically, the radar system 1 includes a radar device 10 and a power-supply device 50 that supplies electrical power to the radar device 10. The radar device 10 transmits and receives a radar wave (continuous wave), mixes a received signal Sr (reflected wave) with its transmit signal Ss to generate a beat signal BT, samples the beat signal BT, and generates the object information on the basis of a Fourier transform (usually, Fast Fourier transform (FFT)) of the sampled beat signal.

The radar device 10, which is a FM-CW radar in the present embodiment, includes a D/A converter 21 that generates a modulation (or modulating) signal having a triangular wave form in response to a modulation command, an oscillator 22 that generates a radio-frequency (RF) signal in a millimeter waveband modulated in frequency by a modulation signal (or modulating signal) generated in the D/A converter 21, an amplifier 23 that amplifies the radio-frequency signal generated in the oscillator 22, a power distributor 24 that splits an output of the amplifier 23 into a transmit signal Ss and a local signal L, a transmit antenna 25 that emits a radar wave in response to the transmit signal Ss, and multiple receive antennas 30 including n receive antennas for receiving the radar wave.

The radar device 10 further includes a receive switch 31 that sequentially selects the multiple receive antennas 30 and forwards a received signal Sr from selected one of the receive antennas for further processing, a mixer 32 that mixes the received signal Sr from the receive switch 31 with the local signal L to generate the beat signal BT, an amplifier 33 that amplifies the beat signal BT generated in the mixer 32, a filter 34 that removes an unnecessary signal component from the beat signal BT amplified by the amplifier 33, an A/D converter 35 that samples an output of the filter 34 to convert the beat signal BT into digital data, and a signal processor 40 that outputs the modulation command and controls the oscillator 22 (e.g., activation and deactivation) and generates the object information on the basis of a Fourier transform of acquired data via the A/D converter 35 (referred to as sampled data).

In particular, the signal processor 40 includes an arithmetic processing unit (e.g., DSP (digital signal processing)) (not shown) that performs a fast Fourier transform (FFT) on the sampled data, and a microcomputer (not shown) that controls the oscillator 22 and the A/D converter 35 and generates the object information through well-known processing of a fast Fourier transform of the sampled data. The microcomputer and the DSP operate in response to a reference clock. The radar device 10 receives the reference clock Cl generated in a reference clock generation circuit 80.

Figure 3:
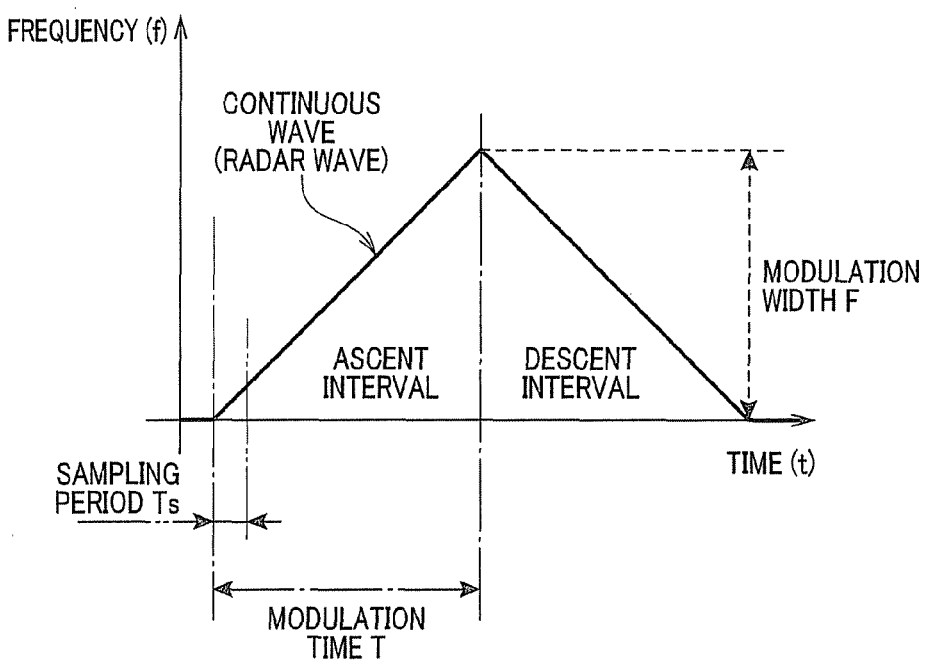
FIG. 3 exemplarily shows a single triangular modulation pattern in accordance with the first embodiment.

A modulation command is outputted from the processor 40 (particularly, a command output 41 therein) at a predetermined time interval including an ascent interval in which the frequency of modulation signal is linearly increasing with time and a descent interval in which the frequency of modulation signal is linearly decreasing with time. The continuous wave to be emitted from the transmit antenna 25 in response to the modulation command is a radio-frequency (RF) signal modulated in frequency by the modulation signal where one cycle of the modulation signal has a triangular wave form or a single triangular modulation pattern (as shown in FIG. 3).

In the radar device 10, a frequency of the beat signal BT is proportional to a distance from the own vehicle to an object reflecting the radar wave. Therefore, in the radar device 10, an upper limit frequency fb_max of the beat signal BT is defined as a frequency corresponding to a maximum distance $R_{max}$ (= $(c/4) \times (T/(F \times Ts))$), where c is a radio wave propagation speed, F is a frequency modulation width, T is a frequency modulation time, Ts is a sampling period. The object is detectable at up to the maximum distance Rmax from the radar device.

In the A/D converter 35, the sampling frequency fs for sampling the beat signal BT is set such that the Nyquist frequency $f_N$ (=fs/2) is higher than the upper limit frequency fb_max of the beat signal BT. That is, in the A/D converter 35, the beat signal BT is oversampled at a sampling frequency fs higher than any frequency of the beat signal BT required to detect the object. In the present embodiment, it is supposed that a switching frequency at which the receive switch 31 sequentially switches between receive channels CHi (i=1 to n) is much higher than the sampling frequency fs in the A/D converter 35.

There will now be explained an operation of the radar device 10.

In the radar device 10, after amplification of the radio-frequency signal in the amplifier 23 preceded by generation of the radio-frequency signal in the oscillator 22, the radio-frequency signal is spited into the transmit signal Ss and the local signal L by the power distributor 24. The transmit signal Ss is transmitted as a radar wave via the transmit antenna 25.

The radar wave reflected from the object (reflected wave) is received by all of the multiple receive antennas 30. Only a signal Sr received in a receive channel CHi (i=1 to n) selected by the receive switch 31 is forwarded to the mixer 32. The mixer 32 mixes the received signal Sr with the local signal L fed from the power distributor 24 to generate the beat signal BT. Subsequently, the amplifier 33 amplifies the beat signal BT and the filter 34 removes a unnecessary signal component from the amplified beat signal BT. The signal processor 40 receives the beat signal (digital data) through the A/D converter 35. The signal processor 40 performs FFT on the beat signal BT to generate the object information on the basis of a frequency peak detected in the frequency distribution of the beat signal BT.

In the present embodiment, the object information is to be generated in the signal processor 40 using a well-known algorithm for the FM-CW radar device as follows.

The signal processor 40 performs the fast Fourier transform (FFT processing) on the sampled data outputted from the A/D converter 35, and detects a frequency peak present on a power spectrum of the beat signal BT for each of ascent and descent intervals for each receive channel CHi (i=1 to n). Further, the signal processor 40 performs direction analysis using a well-known multiple signal classification (MUSIC) algorithm to estimate a direction in which a candidate object present on the basis of the power spectrum of the beat signal BT.

Thereafter the signal processor 40 performs pair matching to determine which frequency peak present on the power spectrum of the ascent interval corresponds to which frequency peak present on the power spectrum of the subsequent descent interval. That is, when a candidate object associated with a frequency peak present on the power spectrum of the ascent interval and a candidate object associated with a frequency peak present on the power spectrum of the descent interval can be considered the same, these two peaks are paired with each other for registration.

In the pair matching, for each registered pair of frequency peaks, the signal processor 40 estimates a distance from the radar device to the candidate object and a speed of the candidate object relative to the own vehicle (relative speed of the candidate object) using a well-known algorithm for the FM-CW radar. The signal processor 40 estimates a speed for each candidate object on the basis of the relative speed of the candidate object and the speed of the own vehicle to determine whether or not the candidate object is stationary or moving. Subsequently, the signal processor 40 produces the object information including the distance and the relative speed and the direction of the candidate object.

(Power-supply Device)

There will now be explained the power-supply device.

Figure 2:
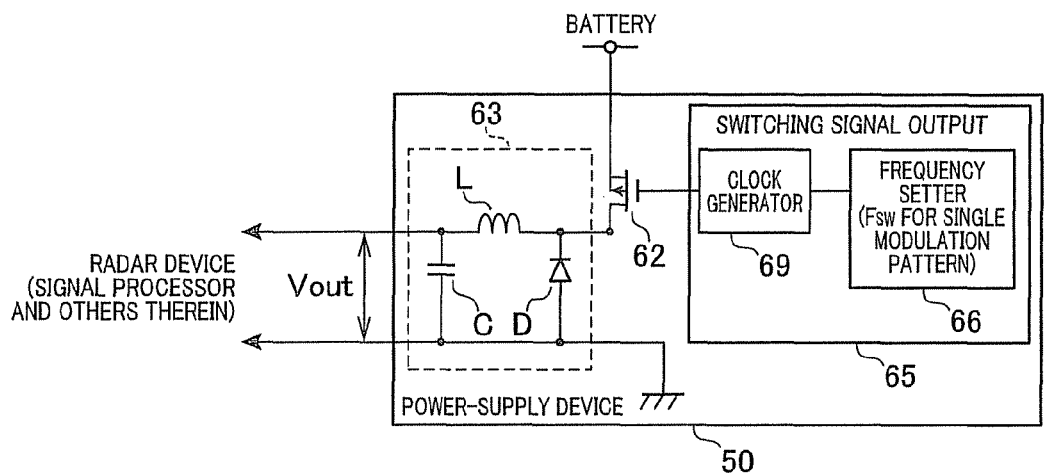
FIG. 2 schematically shows a block diagram of a power-supply device in accordance with the first embodiment.

FIG. 2 schematically shows a block diagram of the power-supply device 50 of the present embodiment. As shown in FIG. 2, the power-supply device 50, which serves as a switching regulator, includes a switcher 62 that includes a switching element (MOSFET in the present embodiment) connected to a vehicle battery mounted in the own vehicle, a smoothing circuit 63 that converts an output voltage of the switcher 62 into a stable average voltage $V_{out}$ in a predefined voltage range, and a switching signal output 65 that generates a switching signal for turning on and off the switcher 62.

The smoothing circuit 63 includes a freewheeling diode D, a choke coil L, and a capacitor C.

The switching signal output 65 includes a frequency setter 66 that sets a switching frequency fsw for turning on and off the switcher 62 and a clock generator 69 that generates a clock signal (i.e., switching signal) of the frequency fsw set in the frequency setter 66.

Figure 4:
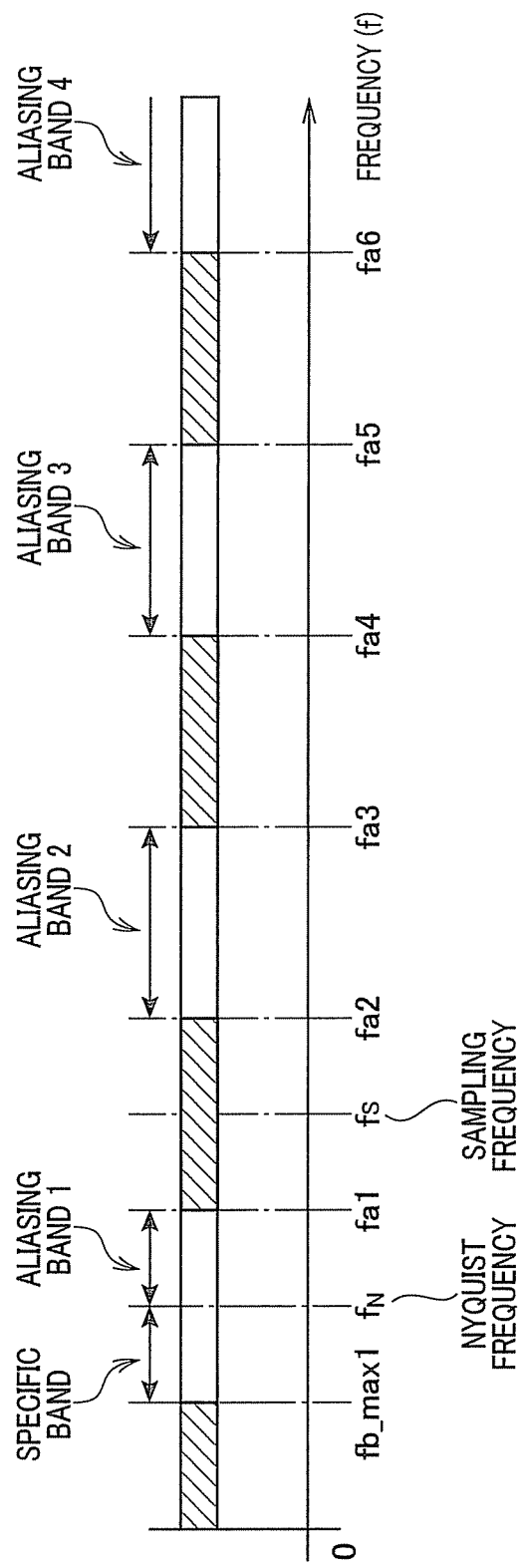
FIG. 4 schematically shows frequency bands for the modulation pattern in accordance with the first embodiment.

In the present embodiment, the switching frequency fsw that is an inverse of a period of variation in signal level of the switching signal (ON/OFF period of the switcher 62) is set within one of assignable bands. The assignable bands, as shown in FIG. 4, include a frequency band (hereinafter referred to as a specific band) from the upper limit frequency $fb\_max1$ of the beat signal BT to the Nyquist frequency $f_N$ (half a sampling frequency fs for sampling the beat signal BT), and all frequency bands (aliasing bands) each aliasing to the specific band during sampling of the beat signal BT in the A/D converter 35 (aliasing band 1 from $f_N$ to fa1, aliasing band 2 from fa2 to fa3, aliasing band 3 from fa4 to fa5, aliasing band 4 from fa6 to fa7 and others, as shown in FIG. 4).

As described above, in the radar system 1 of the present embodiment, the sampling frequency fs for sampling the beat signal BT is set such that the Nyquist frequency $f_N$ (=fs/2) is higher than the upper limit frequency $fb\_max1$ of the beat signal BT. In the power-supply device 50, the switching frequency fsw is preset within one of the specific band and all the aliasing bands.

As described above, in the radar system 1 of the present embodiment, a frequency peak corresponding to the switching frequency fsw in the frequency distribution of the beat signal BT will be detected outside a frequency band (from the lower limit frequency to the upper limit frequency $fb\_max1$ of the beat signal BT) in which a frequency peak can be detected as a function of a distance from the radar device 10 to the object.

Accordingly, the radar system 1 of the present embodiment can securely prevent the frequency peak corresponding to the switching frequency fsw from being erroneously detected as a frequency peak of the object.

In addition, the radar system 1 of the present embodiment can lead to downsizing and simplification of the power-supply device 50.

(Second Embodiment)

Figure 5:
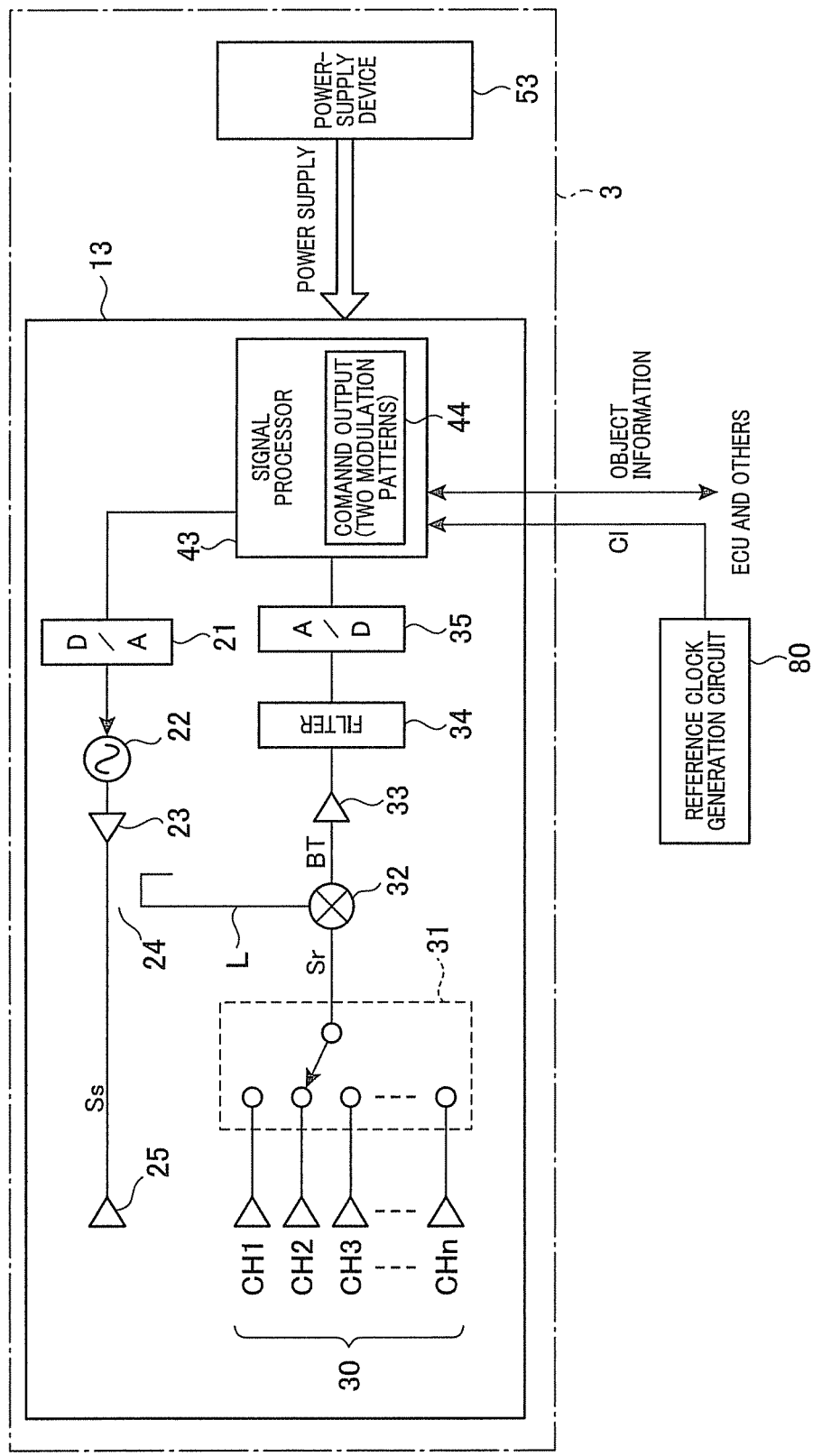
FIG. 5 schematically shows a block diagram of a radar system in accordance with a second embodiment of the present invention.
Figure 6:
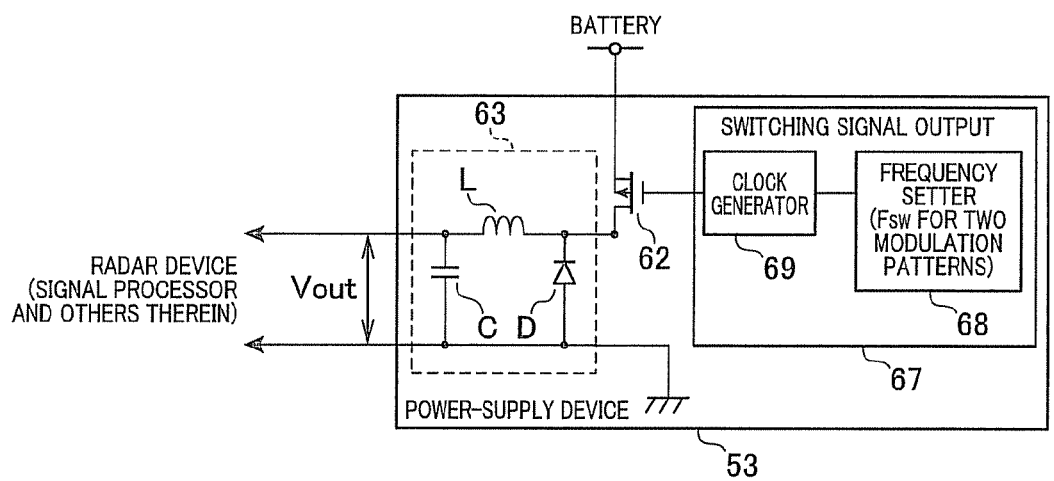
FIG. 6 schematically shows a block diagram of a power-supply device in accordance with the second embodiment.

There will now be explained a radar system in accordance with a second embodiment of the present invention with reference to FIGS. 5 and 6.

The radar system 3 of the present embodiment differs from the radar system 1 of the first embodiment in a modulation command that is outputted from the signal processor 43 in the radar device 13 and a switching frequency fsw that is set by the frequency setter 68 in the power-supply device 53. Only differences of the radar system 3 from the radar system 1 will be explained below.

Figure 7:
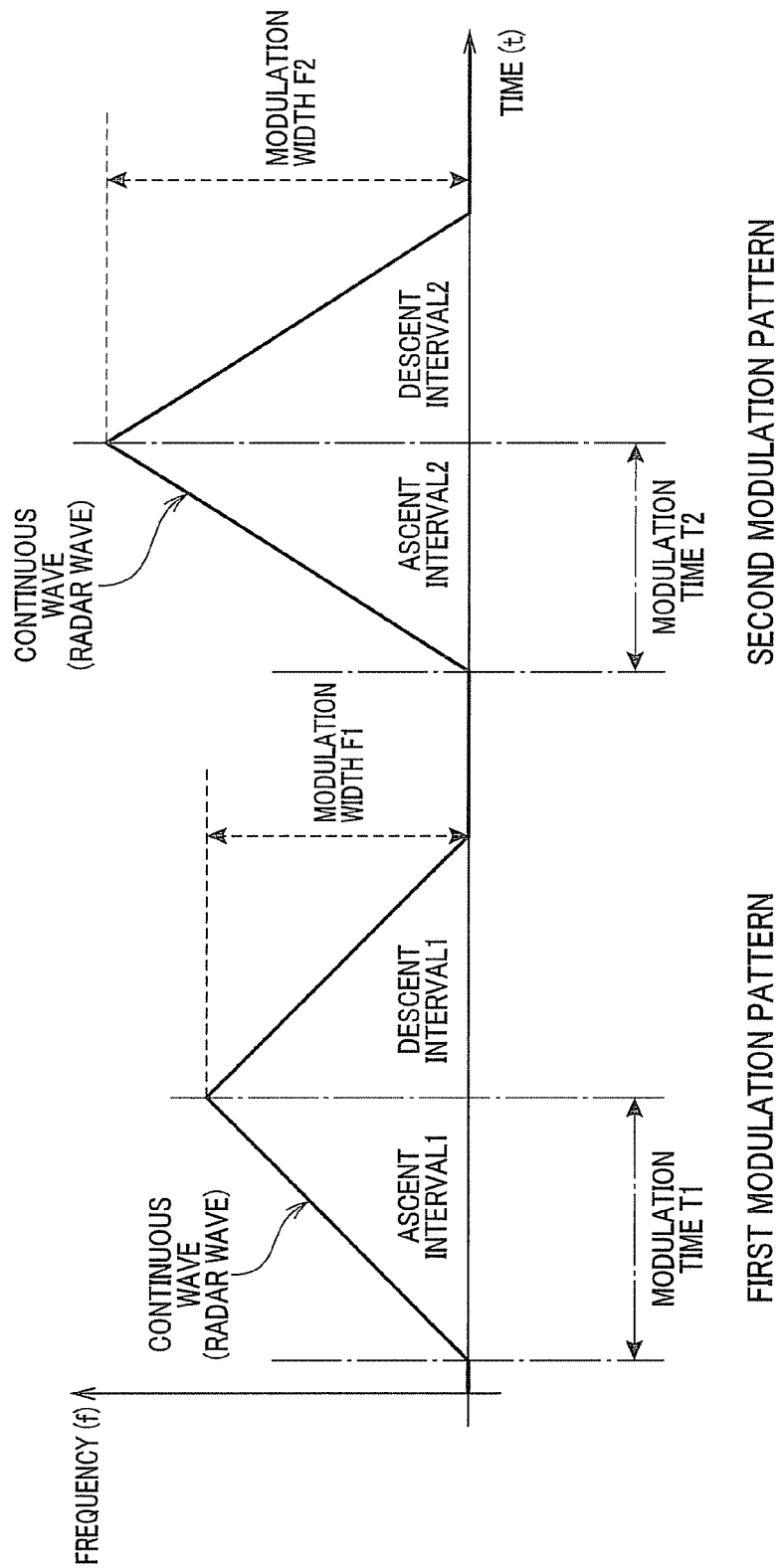
FIG. 7 exemplary shows two triangular modulation patterns in accordance with the second and third embodiments.

The modulation command that is outputted from the signal processor 43 (particularly, a command output 44), as shown in FIG. 7, includes a plurality of triangular modulation patterns (two patterns in the present embodiment) having mutually different slopes each given by a modulation width per time of triangular modulation pattern. In the present embodiment, the second modulation pattern has a larger slope than the first modulation pattern (i.e., F1/T1<F2/T2).

The first modulation pattern and the second modulation pattern subsequent to the first modulation pattern, which form one cycle of modulation signal, are outputted repeatedly at a predetermined time interval.

Each of the first modulation pattern and the second modulation pattern includes an ascent interval in which the frequency of the radar wave is linearly increasing with time and a descent interval in which the frequency of the radar wave is linearly decreasing with time.

The slopes of the first and second modulation patterns may be differentiated from each other by differentiating the modulation widths F1, F2 from each other with the equal modulation times T1, T2 being fixed, or by differentiating the modulation times T1, T2 from each other with the equal modulation widths F1, F2 being fixed, or by differentiating the modulation times T1, 12 from each other and differentiating the modulation widths F1, F2 from each other. In the present embodiment, as an example, the modulation time T1 of the first modulation pattern is larger than the modulation time T2 of the second modulation pattern (T1>T2) and the modulation width F2 of the second modulation pattern is larger than the modulation width F1 of the first modulation pattern (F1<F2).

In the present embodiment, the continuous wave emitted from the transmit antenna 25 in response to the modulation command is a radio-frequency (RF) signal modulated in frequency by the modulation signal, one cycle of which includes the first and second modulation patterns with mutually different slopes. Therefore, the upper limit frequency $fb\_max1$ of the beat signal BT in the first modulation pattern and the upper limit frequency fb_max2 of the beat signal BT in the second modulation pattern can be different form each other.

Thus, in the A/D converter 35 of the present embodiment, the sampling frequency fs for sampling the beat signal BT is set such that the Nyquist frequency $f_N$ (=fs/2) is higher than a higher one of the upper limit frequency fb_max1 of the beat signal BT in the first modulation pattern and the upper limit frequency fb_max2 of the beat signal BT in the second modulation pattern (fb_max2 in the present embodiment). Also in the A/D converter 35 of the present embodiment, the beat signal BT is oversampled at a sampling frequency fs higher than any frequency of the beat signal BT required for the radar device 13 to detect the object.

Transmission and reception of the radar wave modulated in frequency by the modulation signal, one cycle of which includes the first and second modulation patterns with mutually different slopes, allow a detectable range of the object or a distance resolution from the radar device 13 to the object to be changed.

(Power-supply Device)

There will now be explained the power-supply device 53 of the present embodiment.

The power-supply device 53 of the present embodiment differs from the power-supply device 50 of the first embodiment in the switching frequency fsw to be set by the frequency setter 68.

In the present embodiment, the switching frequency fsw is an inverse of a period of variation in signal level of the switching signal (ON/OFF period of the switcher 62). The switching frequency fsw is preset within one of a set of common assignable bands such that each common assignable band is included in one of assignable bands for each modulation pattern.

Figure 8:
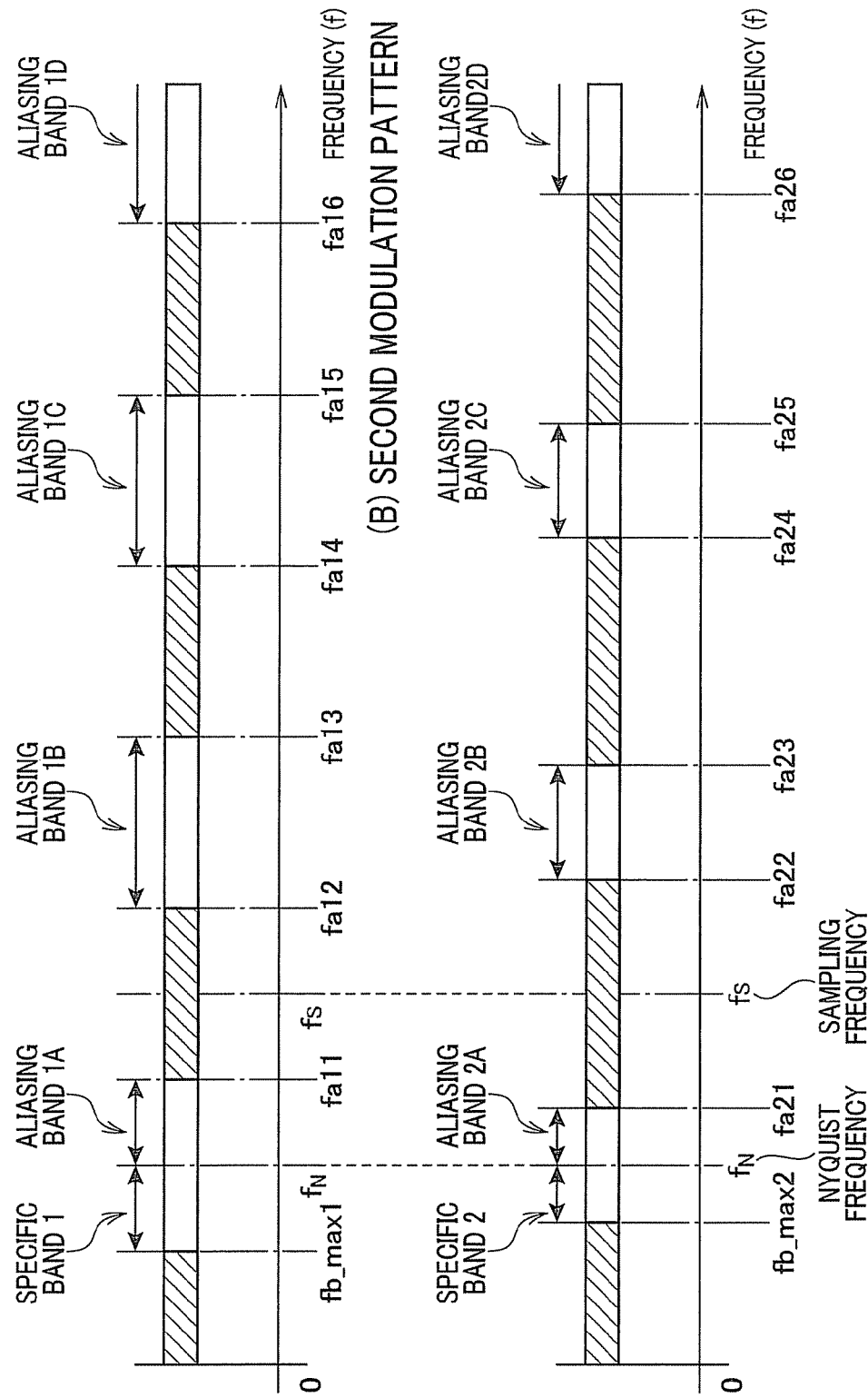
FIG. 8 schematically shows frequency bands for each of the two modulation patterns in accordance with the second embodiment.

For example, as shown in FIG. 8, when the assignable bands for the second modulation pattern are included in the respective assignable bands for the first modulation pattern, the switching frequency fsw may be set within one of the assignable bands for the second modulation pattern (specific band 2, aliasing band 2A, aliasing band 2B, aliasing band 2C, aliasing band 2D and others). It should be noted that the set of common assignable bands is the set of assignable bands for the second modulation pattern in the case of FIG. 8.

As described above, in the radar system 3 of the present embodiment, the switcher 62 is allowed to be turned on and off at a common switching frequency fsw between the first and second modulation patterns having mutually different slopes. Whichever modulation pattern of the two is used for frequency modulation, this can securely prevent the frequency peak corresponding to the switching frequency fsw from being erroneously detected as a frequency peak of the object.

(Third Embodiment)

There will now be explained a radar system in accordance with a third embodiment of the present invention.

Figure 9:
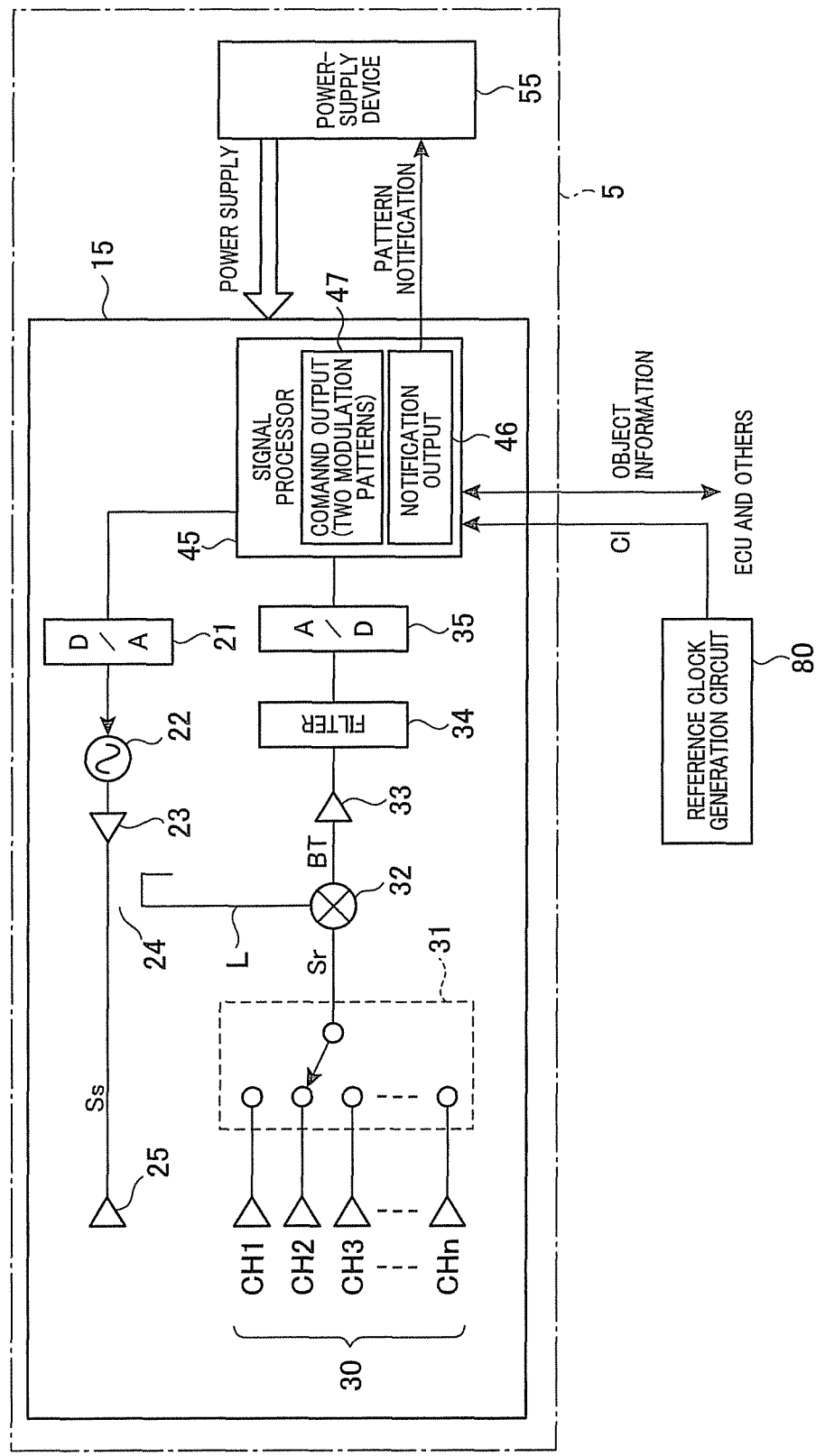
FIG. 9 schematically shows a block diagram of a radar system in accordance with a third embodiment of the present invention.

FIG. 9 schematically shows a block diagram of a radar system in accordance with the third embodiment of the present invention. The radar system 5 of the present embodiment differs from the radar system 3 of the second embodiment in a signal processor 45 in the radar device 15 and a switching signal output 70 in the power-supply device 55. Only differences of the radar system 5 from the radar system 3 will be explained below.

Similarly to the signal processor 43 of the second embodiment, the signal processor 45 of the present embodiment outputs a first modulation pattern and a second modulation pattern subsequent to the first modulation pattern repeatedly at a predetermined time interval. The first and second modulation patterns form one cycle of modulation signal.

The signal processor 45 includes a notification output 46 that outputs to the power-supply device 55 a pattern notification indicative of whether a modulation pattern of the radar wave being emitted from the transmit antenna 25 is the first modulation pattern or the second modulation pattern.

Figure 10A:
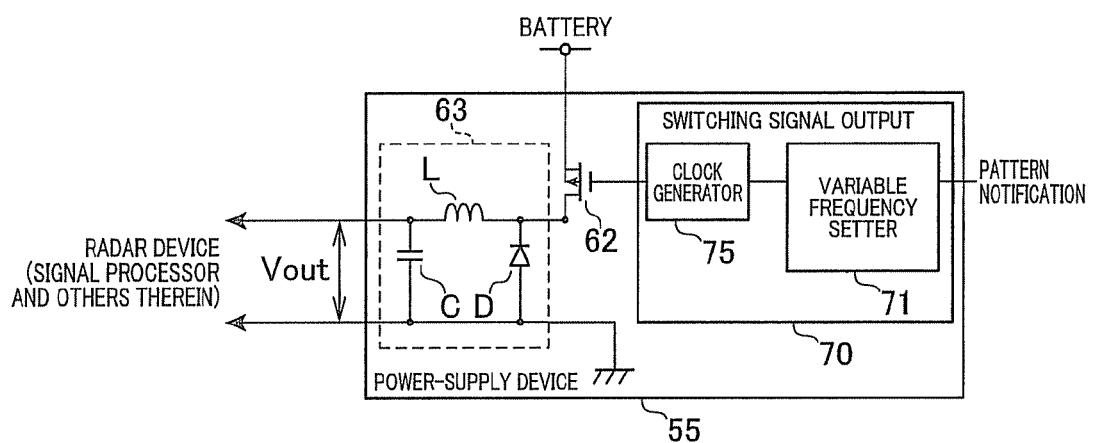
FIG. 10A schematically shows a block diagram of a power-supply device, in accordance with the third embodiment.

In the power-supply device 55 of the present embodiment, as shown in FIG. 10A, the switching signal output 70 includes a variable frequency setter 71 that variably sets a switching frequency fsw for turning on and off the switcher 62 and a clock generator 75 that generates a clock signal (i.e., switching signal) of the switching frequency fsw set in the variable frequency setter 71.

The variable frequency setter 71 of the present embodiment, which includes a resistor-capacitor (RC) circuit with a frequency of its output signal being variable, sets the switching frequency fsw in response to the pattern notification from the notification output 46 in the signal processor 45.

More specifically, the variable frequency setter 71 sets the switching frequency fsw within one of predefined assignable bands for the first modulation pattern when the pattern notification from the notification output 46 indicates that the modulation pattern of the radar wave being emitted from the transmit antenna 25 is the first modulation pattern. As shown in FIG. 8, the predefined assignable bands for the first modulation pattern include, but are not limited to, specific band 1, aliasing band 1A, aliasing band 1B, aliasing band 1C, and aliasing band 1D and others.

On the other hand, the variable frequency setter 71 sets the switching frequency fsw within one of predefined assignable bands for the second modulation pattern when the pattern notification from the notification output 46 indicates that the modulation pattern of the radar wave being emitted from the transmit antenna 25 is the second modulation pattern. As shown in FIG. 8, the predefined assignable bands for the second modulation pattern include, but are not limited to, specific band 2, aliasing band 2A, aliasing band 2B, aliasing band 2C, and aliasing band 2D and others.

Figure 10B:
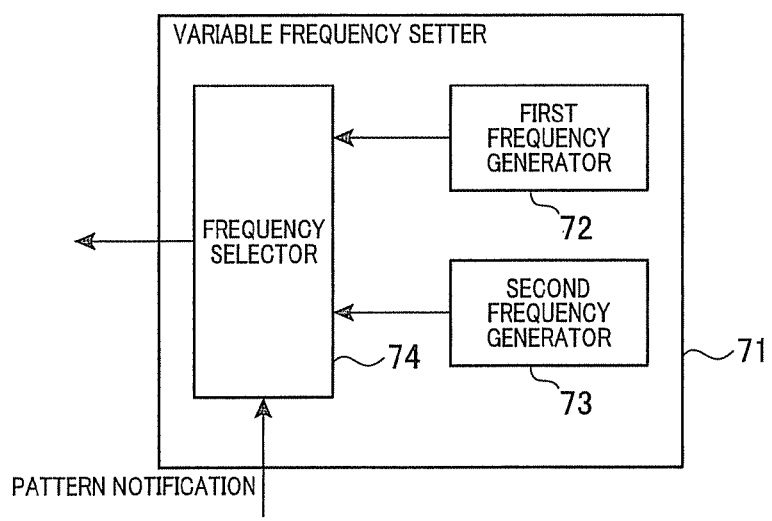
FIG. 10B schematically shows a block, diagram of a variable frequency setter in accordance with the third embodiment of the present invention.

As shown in FIG. 10B, the variable frequency setter 71 includes a first frequency generator 72 that outputs a signal of a switching frequency fsw predefined for the first modulation pattern (denoted by fsw1), a second frequency generator 73 that outputs a signal of a switching frequency fsw predefined for the second modulation pattern (denoted by fsw2), and a frequency selector 74 that selects either one of the signal of fsw1 and the signal of fsw2 in response to the pattern notification from the notification output 46 in the signal processor 45.

In the first frequency generator 72, the switching frequency fsw1 is set within one of predefined assignable bands for the first modulation pattern (specific band 1, aliasing band 1A, aliasing band 1B, aliasing band 1C, and aliasing band 1D and others, as shown in FIG. 8). In the second frequency generator 73, the switching frequency fsw2 is set within one of predefined assignable bands for the second modulation pattern (specific band 2, aliasing band 2A, aliasing band 2B, aliasing band 2C, and aliasing band 2D and others, as shown in FIG. 8).

In the present embodiment, whether the switching frequency fsw is fsw1 or fsw2, the clock generator 75 outputs a clock signal (switching signal) whose duty cycle is kept constant. This allows a voltage of power supplied to the radar device 15 to be kept at a prescribed voltage.

As described above, with the radar system 5 of the present embodiment, it is allowed to select and set an optimal switching frequency fsw for turning on and off the switcher 62 for each of the first and second modulation patterns having mutually different slopes. Accordingly, whatever be the modulation pattern of the continuous wave being emitted from the transmit antenna 25, this can securely prevent the frequency peak corresponding to the switching frequency fsw from being erroneously detected as a frequency peak of the object.

(Other Embodiments)

There will now be explained other embodiments that may be devised without departing from the spirit and scope of the present invention. Only differences from the first to third embodiments will be explained.

In the third embodiment of the present invention, the frequency selector 74 in the variable frequency setter 71 of the power-supply device 55 switches between frequencies of signal to be outputted to the clock generator 75 in response to the pattern notification from the notification output 46. Alternatively, the frequency selector 74 may be configured to activate either one of the first frequency generator 72 and the second frequency generator 73 in response to a mode notification from the signal processor 45.

In the first to third embodiments, the switcher 62 includes a MOSFET as a switching element. Alternatively, the switcher 62 may include any other switching element that can be turned on and off in response to the switching signal.

In the first and second embodiments, the frequency setter 66, 68 in the switching signal output 65, 67 is provided within the power-supply device 50, 53. In the third embodiment, the variable frequency setter 71 in the switching signal output 70 is provided within the power-supply device 55. Alternatively, the frequency setter 66, 68 and the variable frequency setter 71 may be provided outside the power-supply device 50, 53, 55.

In the first to third embodiments, the power-supply device 50, 53, 55 is a step-down (or down-converting) power-supply device. Alternatively, the power-supply device 50, 53, 55 may be a step up power-supply device, a step up and down power-supply device, or other kinds of power-supply device that can supply electrical power in a predefined voltage range.

Figure 11:
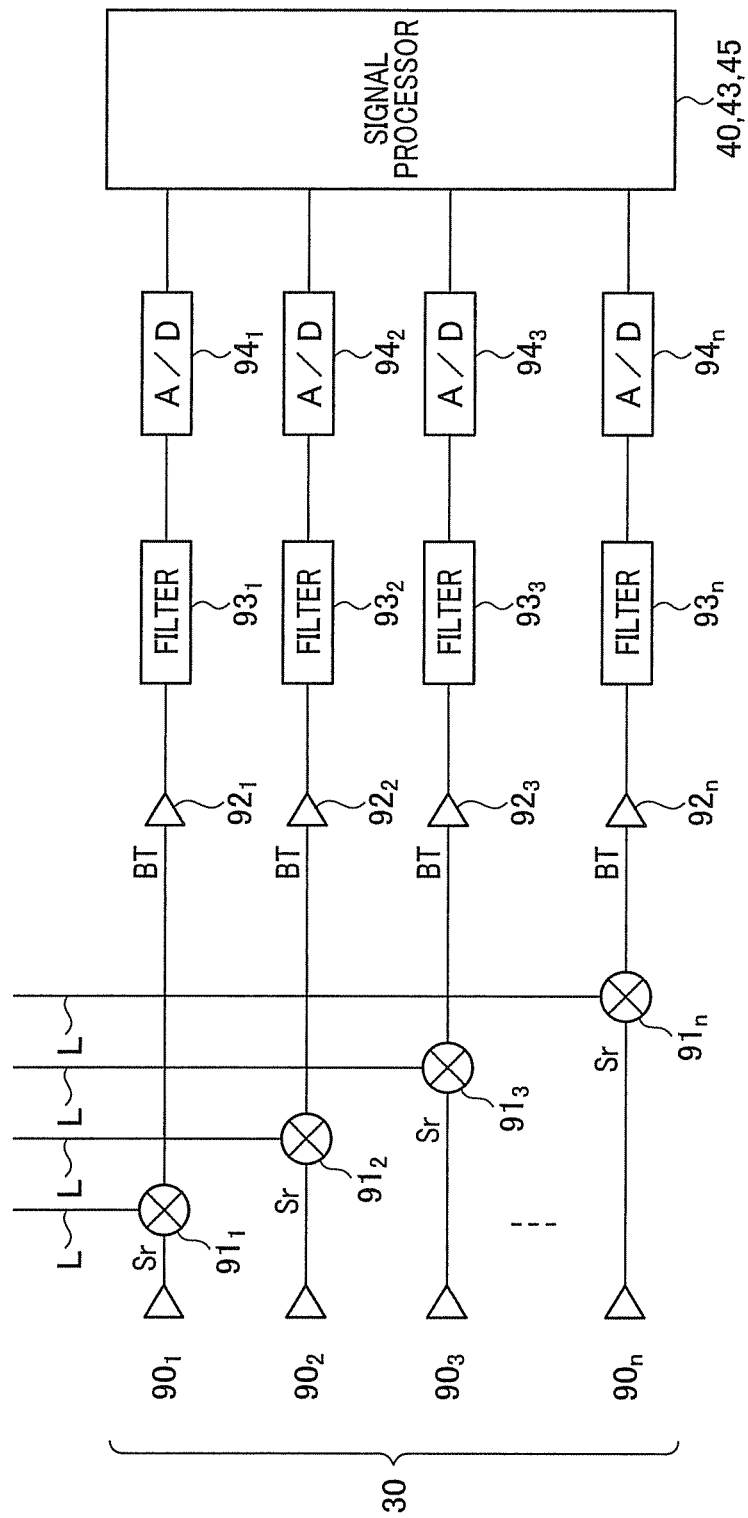
FIG. 11 schematically shows a variation of a receiving system.

In the first to third embodiments, the radar device 10, 13, 15 includes a receiving system from the multiple receive antennas 30 to the signal processor 40, 43, 45 (more specifically, n receive antennas CH1 to CHn, the receive switch 31, the mixer 32, the amplifier 33, the filter 34, and the A/D converter 35). Alternatively, the radar device 10, 13, 15 may include the receiving system without the receive switch 31. More specifically, as shown in FIG. 11, the receiving system includes a plurality of sub-receive systems associated with the respective antennas $90_1$-$90_n$ of the multiple receive antennas 30. The sub-receive system associated with the antenna $90_i$ (i=1 to n) includes a mixer $91_i$ that mixes the received signal Sr from the antenna $90_i$ with the local signal L to generate the beat signal BT, an amplifier $92_i$ that amplifies the beat signal BT generated in the mixer $91_i$, a filter $93_i$ that removes an unnecessary signal component from the beat signal BT amplified by the amplifier $92_i$, and an A/D converter $94_i$ that samples an output of the filter $93_i$ to convert the beat signal BT into digital data.

In the first to third embodiments, the radar system 1, 3, 5 is used with the FM-CW radar. Alternatively, the radar system 1, 3, 5 may be used with frequency-unmodulated CW millimeter wave radar, where there are outputted from the radar device a sequence of continuous waves (in the case of multi-frequency CW radar such as two-frequency CW radar) having mutually different frequencies or a continuous wave of a single frequency (in the case of CW radar).

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A power-supply device for supplying electrical power to a radar device including a transceiving section configured to transmit and receive a continuous wave and mix a received signal with a transmit signal to generate a beat signal, and a signal processing section configured to sample the beat signal generated in the transceiving section and detect an object reflecting the continuous wave on the basis of a Fourier transformation of the sampled beat signal, the power-supply device comprising:
 a switching section configured to turn on and off in response to a switching signal;
 a power supply section configured to:
  generate electrical power in a predefined voltage range via the switching section being turned on and off at a switching frequency of the switching signal; and
  supply the electrical power to the radar device; and
 a switching signal output section configured to output the switching signal at the switching frequency, the switching frequency being set within one of plural assignable bands, the assignable bands being a specific band and all aliasing bands aliasing to the specific band,
 wherein the specific band having a range extending from an upper limit frequency of the beat signal to a Nyquist frequency defined by half a sampling frequency for sampling the beat signal, the sampling frequency being set such that the Nyquist frequency is higher than the upper limit frequency of the beat signal,
 the radar device is configured to frequency modulate a radio-frequency signal in response to a modulation signal, one cycle of the modulation signal including a plurality of triangular modulation patterns having mutually different slopes, the slope for each triangular modulation pattern being given by a modulation width per time of the triangular modulation pattern,
 the radar device further includes a notification output section configured to output a pattern notification indicative of which modulation pattern is being used to modulate the radio-frequency signal, and
 the switching signal output section is configured to output the switching signal at the switching frequency set within one of the assignable bands for the modulation pattern indicated by the pattern notification from the notification output.

2. The device of claim 1, wherein the switching signal output section includes:
 a plurality of frequency signal generating sections for the respective modulation patterns, each frequency signal generating section being configured to output a signal at the switching frequency set within one of the assignable bands for a corresponding modulation pattern; and
 a frequency selecting section configured to select and output one of the signals generated in the frequency signal generating sections in response to the pattern notification outputted from the notification output section.

3. The device of claim 1, wherein the sampling frequency for sampling the beat signal is set such that the Nyquist frequency is higher than a highest upper limit frequency of the beat signal for the respective modulation patterns.

4. A radar system comprising:
a radar device including:
- a transceiving section configured to transmit and receive a continuous wave and mix a received signal with a transmit signal to generate a beat signal; and
- a signal processing section configured to sample the beat signal generated in the transceiving section and detect an object reflecting the continuous wave on the basis of a Fourier transformation of the sampled beat signal; and a power-supply device configured to supply electrical power to the radar device, the power-supply device including:
- a switching section configured to turn on and off in response to a switching signal;
- a power supply section configured to:
  - generate electrical power in a predefined voltage range via the switching section being turned on and off; and
  - supply the electrical power to the radar device; and
- a switching signal output section configured to output the switching signal at a switching frequency within one of plural assignable bands, the assignable bands being a specific band and all aliasing bands aliasing to the specific band,
the specific band having a range from an upper limit frequency of the beat signal to a Nyquist frequency defined by half a sampling frequency for sampling the beat signal, the sampling frequency being set such that the Nyquist frequency is higher than the upper limit frequency of the beat signal,
the radar device is configured to frequency modulate a radio-frequency signal in response to a modulation signal, one cycle of the modulation signal including a plurality of triangular modulation patterns having mutually different slopes, the slope for each triangular modulation pattern being given by a modulation width per time of the triangular modulation pattern,
the radar device further includes a notification output section configured to output a pattern notification indicative of which modulation pattern is being used to modulate the radio-frequency signal, and
the switching signal output section is configured to output the switching signal at the switching frequency set within one of the assignable bands for the modulation pattern indicated by the pattern notification from the notification output.

5. The system of claim 4, wherein the switching signal output section includes:
- a plurality of frequency signal generating sections for the respective modulation patterns, each frequency signal generating section being configured to output a signal at the switching frequency set within one of the assignable bands for a corresponding modulation pattern; and
- a frequency selecting section configured to select and output one of the signals generated in the frequency signal generating sections in response to the pattern notification outputted from the notification output section.

6. The system of claim 4, wherein the sampling frequency for sampling the beat signal is set such that the Nyquist frequency is higher than a highest upper limit frequency of the beat signal for the respective modulation patterns.

* * * * *